United States Patent Office 2,834,744
Patented May 13, 1958

2,834,744
AQUEOUS SODIUM SILICATE ADHESIVE COMPOSITION

James G. Lander, Painesville, Ohio, assignor to Diamond Alkali Company, Cleveland, Ohio, a corporation of Delaware No Drawing. Application August 2, 1956
Serial No. 601,602

6 Claims. (Cl. 260—29.7)

This invention relates to a composition of matter comprising an aqueous adhesive silicate composition, which composition is characterized by high adhesiveness to cellulose-containing materials, such as paper surfaces employed in laminated paper articles, but which is also characterized by lack of adhesion to heated metal surfaces.

In the manufacture of corrugated paperboard, a sheet to be corrugated is passed through corrugating rolls and while the sheet is engaged in the rolls an adhesive composition is applied to the tips of the flutes; thereafter a plane sheet liner is immediately applied to the adhesive surface as the corrugated sheet passes between the corrugating roll and a pressure roll. The resulting single faced web is then carried to the double back side where adhesive is applied to the tips of the flutes of the remaining exposed surface of the corrugated sheet, after which a plane liner sheet is applied to the remaining exposed adhesive corrugated sheet. The thus-formed 3 ply laminate is then passed to a hot plate drier section where it is heated and passes between pressure rolls to dehydrate the adhesive and establish the bond.

Difficulties in the manufacture of such corrugated paperboard arise when aqueous adhesive silicate compositions come into contact with the corrugating and pressure rolls, and the platens of the hot plate driers, forming hard glass-like deposits thereon, thus fouling the rolls and hot plate section and necessitating interrupting production to remove said deposits. Further, as the laminated structure passes between the belts and the platens of the hot plate section, some of the adhesive silicate composition exudes from the portions of the laminate nearest the edges thereof and is deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate. These deposits are then in a position to effect the destruction of the edges of the moving laminated structure passing across the heated platen surface. Moreover, as the production of laminated webs of lesser and greater widths may be scheduled alternately during a given production period, the change-over from the lesser to the greater widths may leave deposits of the dehydrated silicate composition in a position to mar substantial areas longitudinally of the wider webs. When the accumulation of the deposits of dehydrated silicate is sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate adheres quite strongly to the _____ requiring considerable time and hand labor to dislodge the deposit and refinish the surface.

The addition of minor amounts of urea to an otherwise suitable silicate adhesive composition is effective insofar as securing the laminates and in imparting self-releasing properties to the composition from the heated metal surfaces. The quantity of urea that can be employed as an additive to the silicate adhesive can vary from about 2 to 8 percent of the adhesive mixture. The use of amounts of urea, of about 8 percent or more, however, is not particularly desirable since urea is an expensive additive. It is desirable for this reason to use reduced amounts whenever possible without losing the desirable self-releasing function.

Accordingly, an object of this invention is the provision of a composition and method for decreasing the adhesion of an adhesive silicate composition to heated metal surfaces generally.

Another object of the invention is to provide a method and composition for preventing the adhesion of aqueous adhesive silicate compositions commonly employed in the paper laminating industry to the heated metal surfaces of the platens used for forming laminates.

It is a further object of this invention to provide an aqueous adhesive silicate composition that is characterized by low adhesiveness to heated metal surfaces.

In paper laminating operations the speed at which the laminating equipment may operate is directly related to the time required to develop a satisfactory adhesive bond between the several laminates. It is desirable that adhesives be employed which do not require an unduly long heat treatment in the equipment, and further, it is desirable to reduce the heating time required as much as possible.

A still further object of this invention therefore is to provide novel silicate adhesives which not only have the aforementioned desirable characteristics but which permit also greater speed of operation of laminating equipment.

Still another difficulty encountered in the manufacture of boxboard is the tendency of the boxboard to deform as it leaves the boxboard machine and thereafter during final setting of the adhesive. This deformation is known commonly in the art as warping. This, however, is not an especially serious disadvantage in the handling of the boxboard as it is formed, but the formed products are not true geometric replicas of the supporting drawings and specifications, and as such they present an unattractive appearance and sometimes present difficulties in fabricating boxes therefrom, particularly with automatic feeding devices on printer-slotters. According to the present invention the tendency of warping in boxboard products is substantially reduced.

Accordingly, still another object of this invention is to provide a composition of matter, useful under the circumstances described herein, which will substantially reduce the warping tendency of boxboard as it is formed.

The above and other objects will occur to those skilled in the art from the description of the invention set forth hereinafter.

The present invention contemplates the combination of a major proportion of aqueous silicate solution with materials which, while they do not interfere with the ultimate adhesiveness of the dehydrated adhesive silicate composition, nevertheless, provide properties of non-adhesiveness to the heated metallic surfaces which come into contact with the composition, especially parts of boxboard manufacturing equipment.

The compositions of the invention comprise, in addition to the adhesive sodium silicate solution, suitable quantities of urea, a finely divided clay, which may be any predominately aluminum silicate material of sufficient fineness, i. e., of the order of the average particle size of a few microns diameter, and of which Barden Clay is satisfactory, a Piccopale resin, suitably a powdered resin known as Piccopale 100, and water. Additionally, wetting agents which make possible the use of reduced quantities of urea and improve bonding, of which Ultrawet DS, triethanolamine, coconut oil sulfonates, Turkey red oil and the like, are representative and are included in the compositions of this invention. The compositions can also include, if desired, a minor amount of an alkali metal chromate or bichromate, suitably bichromate, to impart corrosion resistant properties to the composition and otherwise contribute to self-release. Piccopale 100 resin aids in the self-release properties of the composition with reduced amounts of urea.

The manner of combining the ingredients of this invention can be as follows: (1) add all the liquid silicate to the container, (2) add water and a wetting agent (if desired, however, the wetting can be incorporated in the silicate), (3) start the agitator and then add the clay, (4) add the Piccopale resin (if desired, the Piccopale can be added between portions of clay), (5) add urea prills. If urea crystals are used, or sodium bichromate, it is desirable to first dissolve them in the water of step 2.

The method of the invention may suitably be carried out by employing a composition prepared as described above in a known type of boxboard or other laminated paper manufacturing machine and in a manner well known and entirely equivalent to that used for ordinary untreated silicate adhesives.

While the relative proportions of the materials in the compositions of the invention are not highly critical, it has been found that suitable compositions, in the sense of high adhesiveness to boxboard structures and low adhesiveness to heated surfaces of boxboard machines, the latter being sufficiently low so that a moving web of paper may dislodge deposits without damage to the paper and in the further sense that good resistance to moisture is provided, low setup times in the equipment is permitted and the tendency to warping of the boxboard is substantially reduced, comprise between about 70–85 percent of aqueous silicate solution containing 35–47 percent solids and averaging on the weight basis 1 part of $Na_2O$ to about 2.5 to 4 parts of $SiO_2$, and suitably within the range of $1Na_2O$ to 3–3.5 $SiO_2$, preferably of about $1Na_2O$ to 3.3 parts of $SiO_2$, and which may suitably contain a small amount of a wetting agent or agents, which wetting agent or agents may be of the nonionic or anionic types. Suitable examples of the anionic type of wetting agent are aromatic monosodium sulfonates derived from petroleum oil, alkyl aryl sulfonates, cocoanut oil sulfonates, Turkey red oil, and the like. Additionally, the wetting agents can also be of the cationic type, however, the anionic type agents are preferred, an example being Turkey red oil which is a sodium salt of sulfonated castor oil. A suitable quantity of wetting agent may be up to about 1 percent; usually, however, amounts ranging in the order of about 0.1 to about 0.01 percent are preferred.

Further, the composition can comprise between about 2 and about 8 percent of urea and, if desired, between about 0.1 and 1 precent of alkali metal bichromate, between about 5 and 20 percent of clay, between about 0.1 and 2.0 percent Piccopale resin, and a quantity of water to make 100 percent.

Preferred quantities of specified ingredients in the composition are about 75–80 percent of silicate solution, about 3 to 6 percent urea, about 0.25 to .75 percent Piccopale resin, about 8 to 14 percent clay, preferably Barden Clay, and of the order of about 5 to 8 percent water.

In the compositions of this invention, clay acts primarily as a spreading agent and the wetting agents facilitate the dispersion of resinous materials, i. e., they aid emulsification in compositions where clay is omitted or facilitate the dispersion of resinous material and clay in the adhesive silicate mixture as well as aiding its flowability.

It might be well to mention here that as between anionic and nonionic wetting agents, there is a striking difference in performance since nonionic wetting agents do not aid in cleaning while the anionic wetting agents do aid such operation.

Some of the advantages of the invention are to some extent lost in the elimination of some ingredients from the proposed compositions. For example, it appears that upon omission of urea there is no self-release of the adhesive as it contacts heated metal surfaces and as the quantity of urea is reduced or eliminated the serious difficulty of adhesive build-up on the equipment begins to manifest itself.

In order that those skilled in the art may have the benefit of specific formulations, the following examples are presented:

*Example I*

A composition is formulated as follows:

|   | Percent |
|---|---|
| Sodium silicate solution containing 0.01% Ultrawet DS (40.8° Bé.) 37.7–8% solids ($Na_2O:SiO_2$ ratio, 1:3.3) | 77.0 |
| Barden Clay | 9.0 |
| Piccopale Resin 100 | 0.5 |
| Urea | 6.0 |
| Water | 7.50 |
|   | 100.0 |

*Example II*

A further exemplary composition is one identical with the foregoing example except that the wetting agent there suggested, though preferably present, is omitted, the quantity of silicate being increased slightly thereby.

*Example III*

A still further exemplary composition is one identical with the foregoing except that 0.3 percent of sodium bichromate is added, while the quantity of silicate is reduced accordingly.

*Example IV*

Another composition of this invention is formulated as follows:

|   | Percent |
|---|---|
| Sodium silicate solution (40.8° Bé.) 37.7–8% solids ($Na_2O:SiO_2$ ratio, 1:3.3) | 78.23 |
| Barden Clay | 9.0 |
| Piccopale Resin 100 | 0.25 |
| Turkey red oil | 0.02 |
| Urea | 4.5 |
| Water | 8.0 |
|   | 100.00 |

Example IV above may, if desired, contain a minor amount of sodium bichromate, suitably about 0.3 percent.

In the foregoing examples, the order of combining the ingredients is as described hereinabove.

In the present invention it appears that the addition of Piccopale resin is responsible for the considerable reduction in the heretofore required quantity of urea, the increase in moisture resistance and the improvement as regards warping tendencies. The term Piccopale is a trade-name applied to a series of organic compounds prepared and sold by the Pennsylvania Industrial Chemical Corporation of Clairton, Pennsylvania. There are several types of Piccopale resins and, ordinarily, they are purchased according to their specified softening points. For purposes of this invention it is found that such resins, which are polymerized petroleum resins, having softening points at from about 60 to about 150° C. are suitable. More particularly, for example, Piccopale 100 is defined as a polymerized petroleum resin constituted of methylated paraffin chains having limited unsaturation and softening at about 100° C. This polymerization product is obtained by catalytically reacting in a carefully controlled condition a mixture of monomers having an average molecular weight of approximately 90 and composed essentially of dienes and reactive olefins to produce a hard, solid resin with a resulting average molecular weight of about 1100. Piccopale 100 has the following properties:

Physical:
- Form _____ Thermoplastic solid.
- Softening point, ball and ring _____ 100+3° C.
- Specific gravity @ 25/25° C. _____ .970–.975.
- Pounds per gallon ____ 8.12.
- Color:
  - Coal tar scale ___ 2½ max.
  - Rosin scale _____ F.
  - Gardner scale_____ 13.
- Flash point, C. O. C. __ 500° F.
- Fire point _____ 520° F.
- Refractive index @ 20° C. _____ 1.5116.

Chemical:
- Acid number _____ Less than 1.
- Saponification No. ___ Less than 2.
- Ash _____ 0.2% max.
- Iodine value (WIJS) __ 120.
- Iodine value (corrected for substitution) ___ 30.
- Bromine number _____ 7.3.
- Molecular weight ____ 1100.
- Double bonds per mol. (bromine number) __ 1.
- Hydrogen absorption (Adams catalyst) __ Practically nil.

The term Ultrawet DS is a trade-name applied to a series of surface active agents containing aromatic monosodium sulfonate with or without the addition of sodium sulfate and manufactured by The Atlantic Refining Company. A specific illustrative surface active agent of this type is sodium dodecyl benzene sulfonate.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same result in substantially the same or equivalent manner, it being intended to cover the invention broadly in whatever form its principle may be utilized.

What is claimed is:

1. A composition of matter comprising:

|  | Percent |
|---|---|
| Aqueous silicate glass solution ($Na_2O:SiO_2$ ratio, 1:2.5–4, 35–47% solids) | 70–85 |
| Urea | 2–8 |
| Clay | 5–20 |
| Piccopale Resin | 0.1–2 |
| Water | Balance to 100 |

2. A composition of matter as defined in claim 1, including between about 0.01 and 0.1 percent by weight of a wetting agent based upon the silicate present.

3. A composition of matter as defined in claim 1 including between about 0.2 to 0.4 percent sodium bichromate.

4. A composition of matter comprising:

|  | Percent |
|---|---|
| Aqueous silicate glass solution ($Na_2O:SiO_2$ ratio, 1:2.5–4, 35–47% solids) | 75–80 |
| Urea | 2–6 |
| Clay | 8–14 |
| Piccopale Resin | 0.4–0.6 |
| Water | Balance to 100 |

5. A composition of matter as defined in claim 4 including between about 0.2 to 0.4 percent sodium bichromate.

6. A composition of matter as defined in claim 4 including between about 0.01 and about 0.1 percent by weight of a wetting agent based upon the silicate present.

References Cited in the file of this patent

UNITED STATES PATENTS

| 2,387,367 | Vana | Oct. 23, 1945 |
| 2,434,466 | Marc | Jan. 13, 1948 |
| 2,481,390 | Campbell | Sept. 6, 1949 |
| 2,554,035 | Kreyling | May 22, 1951 |
| 2,671,747 | Lander | Mar. 9, 1954 |

U. S. DEPARTMENT OF COMMERCE
PATENT OFFICE

CERTIFICATE OF CORRECTION

Patent No. 2,834,744     James G. Lander     May 13, 1958

It is hereby certified that error appears in the printed specification of the above numbered patent requiring correction and that the said Letters Patent should read as corrected below.

Column 5, line 13, for "100 +3° C." read --100 ±3° C.--.

Signed and sealed this 1st day of July 1958.

(SEAL)
Attest:
KARL H. AXLINE
Attesting Officer

ROBERT C. WATSON
Commissioner of Patents